(12) United States Patent
Gibbs (10) Patent No.: US 8,942,884 B2
(45) Date of Patent: Jan. 27, 2015

(54) TRANSPORT SYSTEM

(75) Inventor: Paul Gibbs, Chicago, IL (US)

(73) Assignee: Innovative Transport Solutions, LLC, Bensenville, IL (US)

( * ) Notice: Subject to any disclaimer, the term of this patent is extended or adjusted under 35 U.S.C. 154(b) by 919 days.

(21) Appl. No.: 12/687,651

(22) Filed: Jan. 14, 2010

(65) Prior Publication Data

US 2011/0172875 A1 Jul. 14, 2011

(51) Int. Cl.
*B60P 1/52* (2006.01)
*B65G 67/20* (2006.01)

(52) U.S. Cl.
CPC .................................. *B65G 67/20* (2013.01)
USPC ............................................................ 701/31.4

(58) Field of Classification Search
USPC ........ 414/392, 395, 398, 400; 701/24, 33, 37, 701/48, 50
See application file for complete search history.

(56) References Cited

U.S. PATENT DOCUMENTS

| | | | | |
|---|---|---|---|---|
| 3,944,096 A | * | 3/1976 | Carder | 414/345 |
| 4,634,334 A | * | 1/1987 | Hahn et al. | 414/401 |
| 6,130,487 A | * | 10/2000 | Bertalan et al. | 307/9.1 |
| 2002/0124491 A1 | * | 9/2002 | Hahn et al. | 52/174 |
| 2003/0057058 A1 | * | 3/2003 | Iwasa | 198/419.3 |
| 2006/0099056 A1 | * | 5/2006 | Weidemann et al. | 414/373 |
| 2007/0210156 A1 | * | 9/2007 | Bochicchio | 235/385 |
| 2007/0237612 A1 | * | 10/2007 | Mammome et al. | 414/420 |
| 2009/0010743 A1 | * | 1/2009 | Wilz | 414/339 |

* cited by examiner

*Primary Examiner* — John Q Nguyen
*Assistant Examiner* — Rodney P King
(74) *Attorney, Agent, or Firm* — Brinks Gilson & Lione (57) ABSTRACT

A mobile moving system that faculties freight movement includes movable approach ramps and a mobile base. The mobile base includes material handling devices configured to move freight longitudinally between a loading position, a transport position, and an unloading position. Parallel pocket members having a hollow-box-like shape are positioned along a portion of the plurality of the material handling devices to increase the torsional strength and rigidity of the material handling devices. The parallel pocket members are spaced apart and dimensioned so that each of the plurality of parallel pocket members may receive one or more prongs of an industrial vehicle.

16 Claims, 12 Drawing Sheets

FIGURE 12

TRANSPORT SYSTEM

BACKGROUND OF THE INVENTION

1. Technical Field

This disclosure relates to conveying objects, and more particularly to loading and unloading freight.

2. Related Art

Loading parcels onto vessels or vehicles may be labor intensive. Loaders compensate for the static weight of freight and the dynamic forces generated by its movement. Dock design and trailer grades may complicate the process. The height, degree of inclination, or slope of a dock or a trailer and the link between them may affect the productivity, safety, and transportation costs of loading and unloading freight.

Since freight is often loaded and unloaded several times before it reaches a destination, it is susceptible to damage. In addition to the variable forces put on a load by its movement, there is often little consistency between loaders and handlers and loading and handling procedures. Loads that are stable under one process may lean, fall, or become damaged by another process. In spite of these outcomes, it is impractical to expect uniform control of the loading and handling processes of geographically disparate delivery systems.

SUMMARY

A mobile moving system that facilitates freight movement includes movable approach ramps and a mobile base. The mobile base includes material handling devices configured to move freight longitudinally between a loading position, a transport position, and an unloading position. Parallel pocket members having hollow-box-like shapes are positioned along a portion of the plurality of the material handling devices to increase the torsional strength and rigidity of the material handling devices. The parallel pocket members are spaced apart and dimensioned so that each of the plurality of parallel pocket members may receive one or more prongs of an industrial vehicle.

Other systems, methods, features and advantages of the inventions will be, or will become, apparent to one with skill in the art upon examination of the following figures and detailed description. It is intended that all such additional systems, methods, features and advantages be included within this description, be within the scope of the inventions, and be protected by the following claims.

BRIEF DESCRIPTION OF THE DRAWINGS

The inventions can be better understood with reference to the following drawings and description. The components in the figures are not necessarily to scale, emphasis instead being placed upon illustrating the principles of the inventions. Moreover, in the figures, like referenced numerals designate corresponding parts throughout different views.

DETAILED DESCRIPTION OF THE PREFERRED EMBODIMENTS

A mobile moving system may move bulk materials, palatalized loads, non palatalized unitized loads, parcels, crates, totes, drums, carts, bundles, loose items, etc, onto devices or structures for transporting persons or things (e.g., vehicle). The system may convey these materials to truckload (TL) carriers, less-than-truckload (LTL) carriers, airfreight carriers, rail cars, parcel carriers, local delivery vehicles, and vessels. The system may provide multiple modes of accumulation across multiple zones, bi-directional movement (e.g., sequentially or simultaneously), and multi-speed movement that may be carried or moved from one transport system to another with ease. Some mobile moving systems may transform a straight vehicle (e.g., a vehicle about one half the size and capacity of a tractor-trailer) into a conveyor or roller-bed (e.g., an adjustable conveyor) vehicle.

Figure 1:
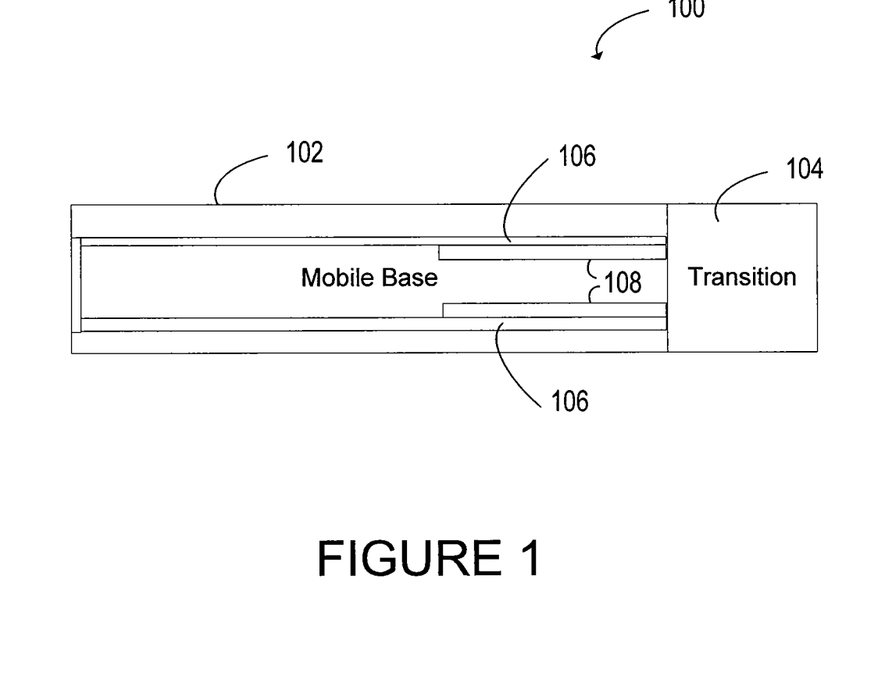
FIG. 1 is a block diagram of a transport system.

FIG. 1 is a block diagram of a transport system 100 that may convey freight individually or simultaneously. The transport system 100 includes a mobile base 102 and one, two, or more fixed or movable approach ramps 104. The mobile base 102 includes material handling devices (e.g., one, two, or more) that may move freight longitudinally (or substantially, in a longitudinal direction) between a loading position, a transport position, and an unloading position. Locking receptacles or a locking track 106 may receive or position uprights, separators, or load bars (e.g., telescoping load bars or uprights) to secure and protect freight. Parallel pocket-members 108, that may have a hollow box-like shape, may be positioned along a portion of the material handling devices to increase torsional strength and rigidity. In some applications, the pocket members 108 are dimensioned or configured to receive forks such as pallet forks making the transport system 100 forklift movable from one vehicle or trailer to another. Such applications do not limit the transport system 100 to dedicated or customized trailers.

Rotatable approach ramps 104 may connect or couple the mobile base 102 to an adjacent surface. The approach ramps 104 may automatically adjust (e.g., self-leveling) to various vehicles (e.g., trailer heights) and dock heights. While the vertical operating range may vary by application, in some applications the vertical operating range varies between one, two, or more feet of the of the mobile base's height. A manual or automated actuation may secure the vehicle (e.g., trailer) to a barrier surface or dock floor to secure the vehicle (or trailer) during loading and unloading operations. One or more curved or sharply bent members, such as restraining hooks (e.g., unitary to the underside of one or more of the approach ramps 104), may secure the approach ramps 104 and mobile base 102 to a loading or unloading structure by engaging the structure and establishing a restraining force. When engaged, an optional aural, visual, and/or electronic alarm may identify a secure condition and/or warn of an un-secure connection between one or more of the approach ramps 104 and the barrier surface or dock floor. The curved or sharply bent member may be engaged by a manual, hydraulic, electrical, or pneumatic device or motor. Blocking members and/or cleats may couple the mobile base 102 to the vehicle (or trailer). Substantially cylindrical members with blunt ends may join the approach ramps 104 to the mobile base 102 while supporting the compression force of freight and resisting the tensional force between the approach ramps 104 and mobile base 102.

Cross-members positioned between the material handling devices may provide additional torsional strength and rigidity to the mobile base 102. In some systems, the cross-members are positioned like unevenly spaced rungs on a ladder (e.g., a ladder-like design). Some cross-members terminate between surfaces of the parallel-pocket members 108 and a side surface of one of the material handling devices and other cross-members may terminate between side surfaces of the material handling devices between the locking receptacles or the locking track 106. Some mobile bases 102 have adjustable lengths (or are smaller in length) that may transform a straight truck that may comprise a single cab and body mounted to the vehicle's chassis (versus trailer towed) into a conveyor or roller-type vehicle.

Electric motors, hydraulic motors, pneumatic motors or gravity may impart some or all of the moving force that causes freight to move between a loading position, a transport position, and an unloading position. The motor or motors may drive some or all of the members of the material handling devices (directly or by a slave-driven belt, chains, etc.) to provide a controlled loading, singulation releases, and/or slug releases. A processor executing a computer readable medium (and memory that may be mechanically coupled to the mobile base 102) in communication with or in continuity with optional photoelectric-sensors mechanically coupled (and in some instances diffused) in the material handling devices may ensure that loaded freight is properly positioned (e.g., in a straight, turned, pin-wheeled, or distributed weight position for palletized loads) or separated in desired zones and is unloaded under a selected release protocols (e.g., a singulation or a slug release). The processor may communicate with optional sensors or transducers that indicate that a vehicle (or trailer) is secure to a barrier support wall or dock floor, may communicate with pressure sensors that monitor weight relative to vehicle or trailer load limits, or may communicate with auto-leveling sensors or transducers that detect height or level changes between some or all of the members of the material handling devices between the front and rear (or between the sides) of a trailer or vehicle. When a height variation is detected (from a level or programmed plane), the processor may actuate one or more load level switches that cause some or all of the members of the material handling devices to raise or lower along two (or three) coordinates (e.g., from front-to-rear and/or side-to side) or adjust the height of a front, a rear, or a side portion of the entire mobile base 102. The auto-leveling action may prevent or minimize freight shifts during loading and unloading operations, and in some systems, compensate (e.g., in real-time) for freight shift during transport, and in other systems, generate desired inclines that enable or retard gravity flow. Other transport systems 100 may communicate with in-vehicle powertrain controllers (e.g., original equipment manufacturer controllers) and/or powertrain sensors of the vehicle through a wireless or tangible medium. These transport systems may compensate for any monitored vehicle condition such as those monitored by a powertrain controller including hard braking events, quick acceleration events, hard turning or swaying events, tire slippage events, etc., by adjusting the tilt or inclination of the members of the material handling devices or portions of the entire mobile base 102 to counter unstable forces.

Figure 2:
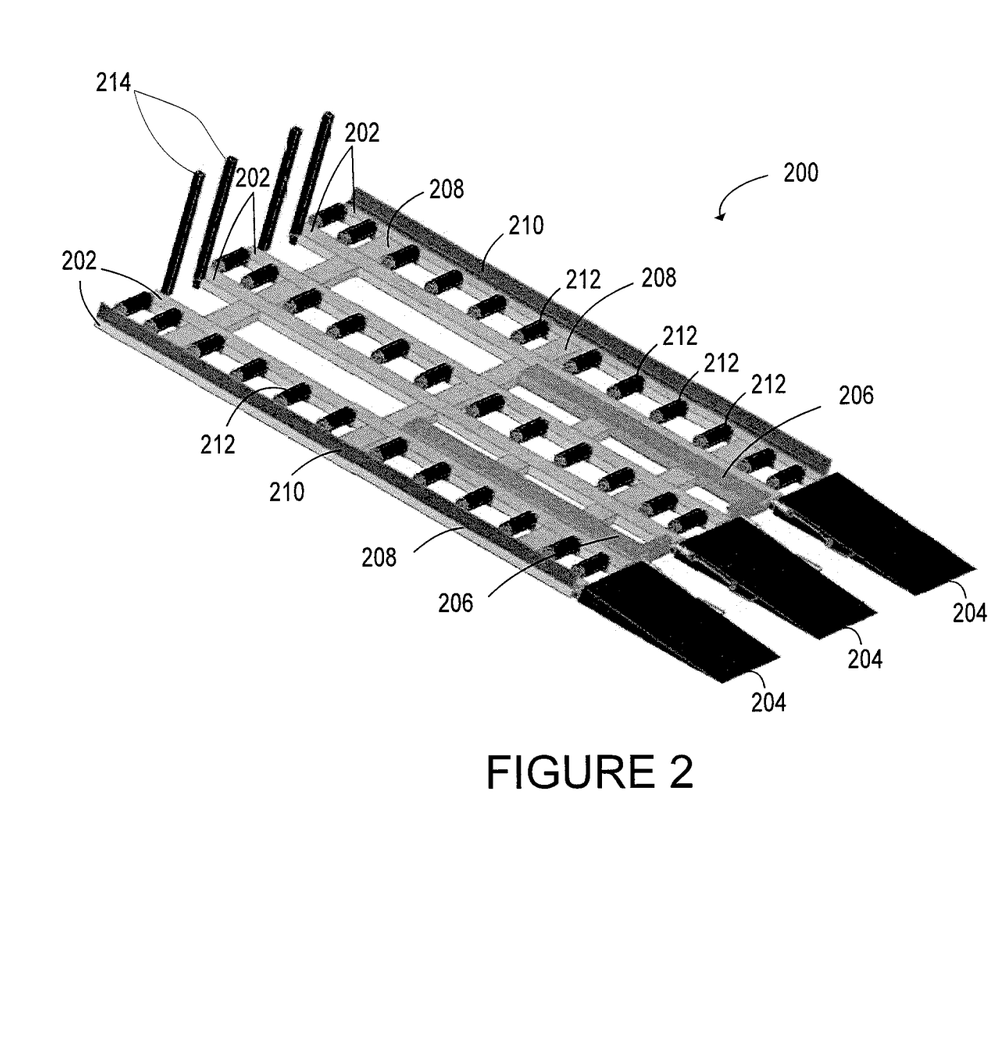
FIG. 2 is a perspective view of an alternate modular transport system.
Figure 4:
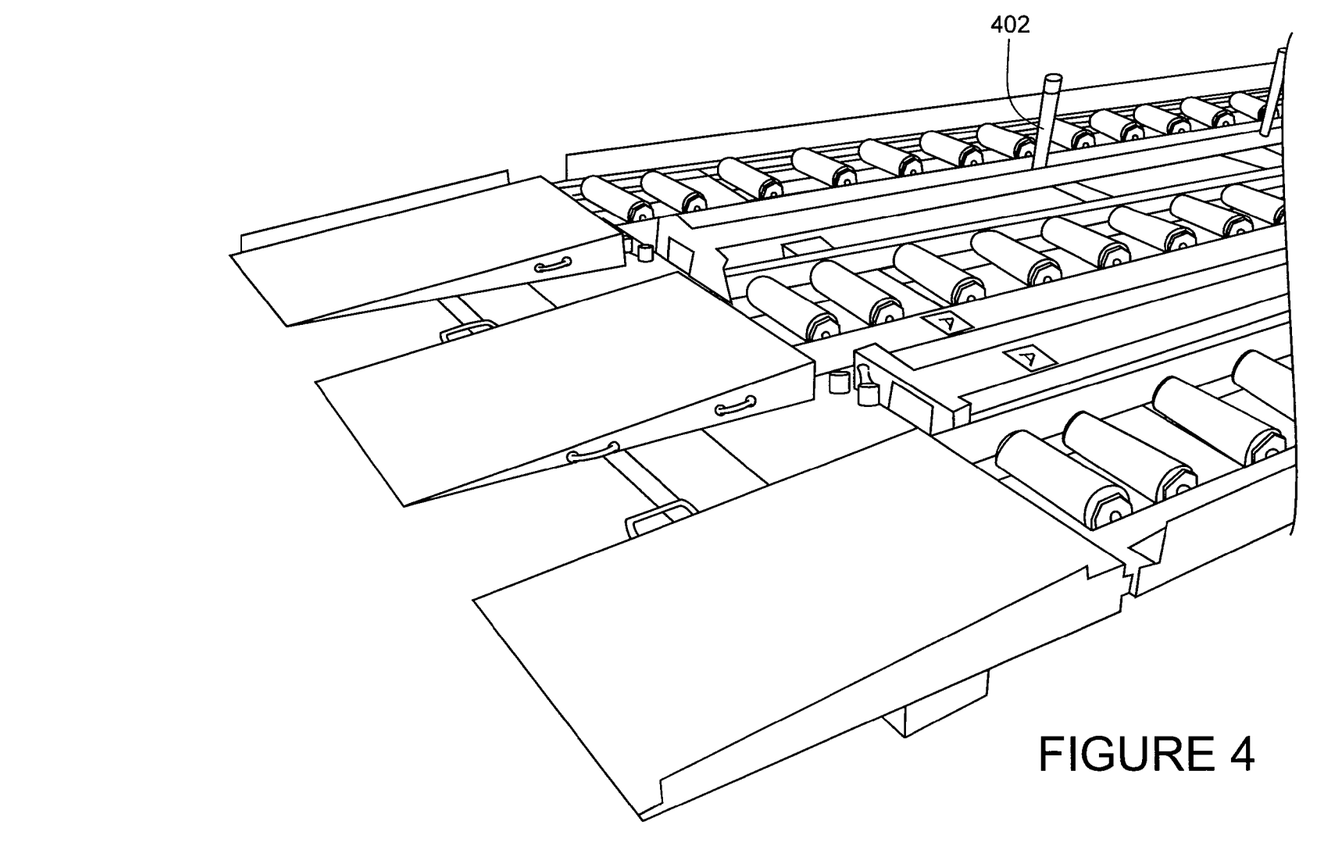
FIG. 4 is a side perspective view of the transport system of FIG. 2.
Figure 5:
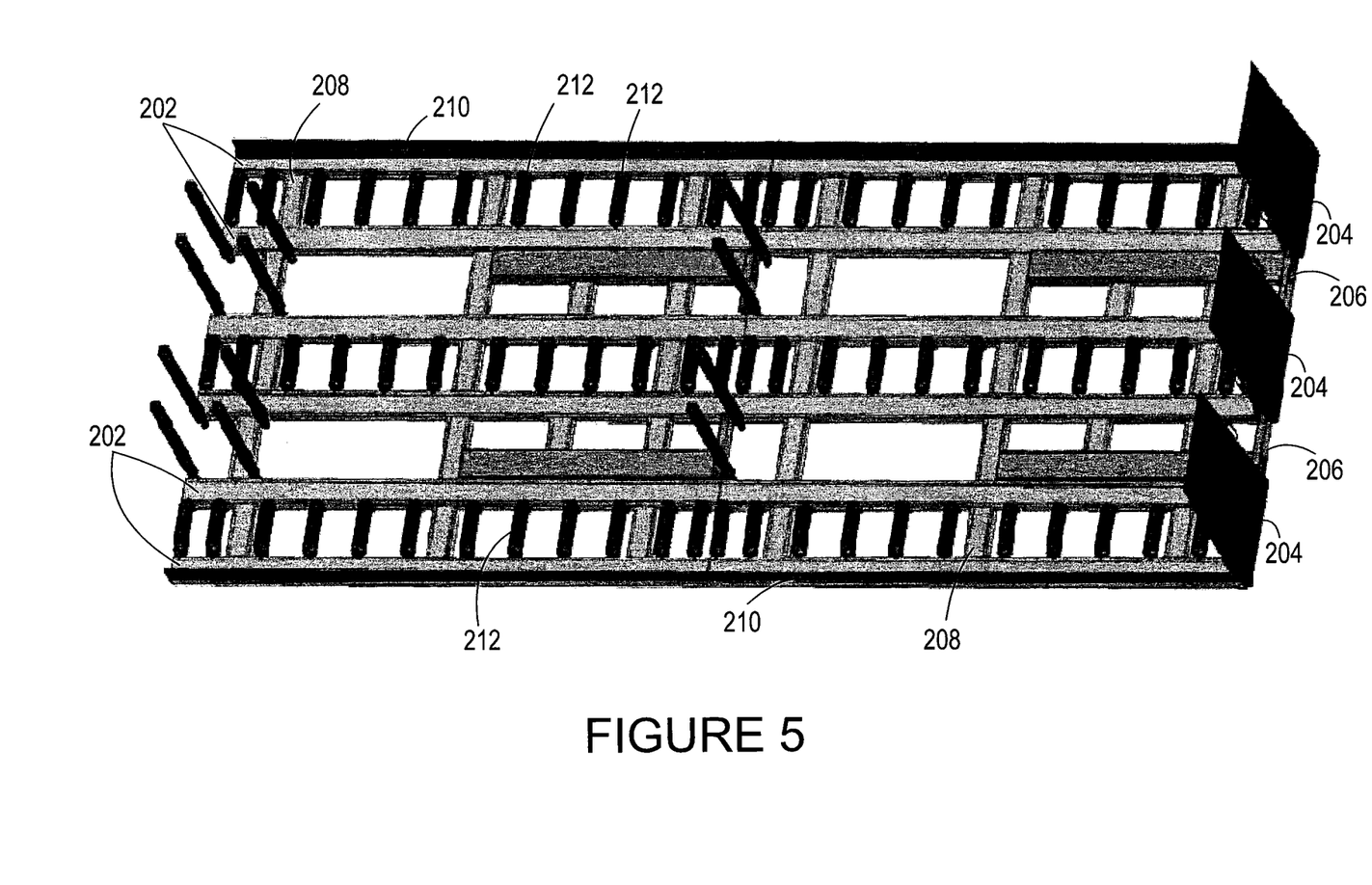
FIG. 5 is a top perspective view of modular transport systems.
Figure 6:
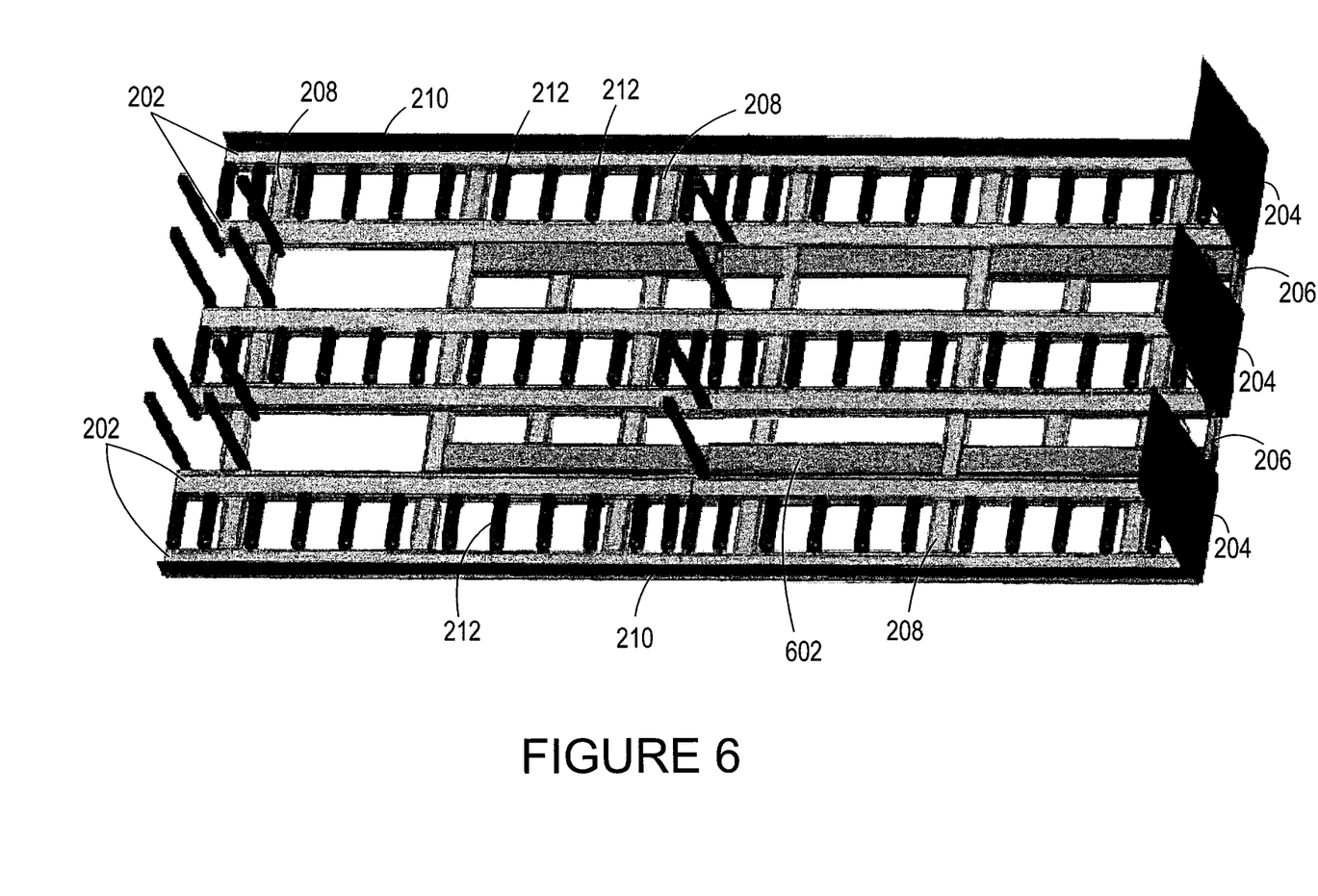
FIG. 6 is a top perspective view of linked modular transport systems.

FIG. 2 is an alternate modular transport system 200 shown from a perspective view. The transport system 200 includes boxed-like frame members 202 extending from the rotatable ramps 204 to removable brace ends 214. Spaced apart cylindrical rollers 212 bridge some of the boxed-like frame members 202 and allow freight to move longitudinally between a loading position, a transport position, and an unloading position. Locking receptacles are equally spaced (e.g., about every ten inches as shown in FIG. 4) along the boxed like frame members 202 to receive uprights 402 that may have a predetermined length (e.g., about two feet) or may comprise telescoping members that are manually or automatically positioned and set (and in some systems, automatically lengthened or adjusted and locked e.g., by a twisting motion). Box-like pocket members 206 are positioned near the loading and unloading positions and are configured to receive forks such as pallet forks making the transport system 200 forklift movable from one vehicle or trailer to another. Some box-like pocket members 206 originate and terminate at hollow ends that may connect other modular transport system 200 in a substantially sequential alignment (as shown in FIG. 5) to any desired length. The ends may be configured to couple or mechanically join and lock other box-like pocket members 206 that are a part of other modular transport systems through multiple linking members or mechanically actuated or automated telescoping members 602 (shown in FIG. 6). The open ends (near the rotatable ramps 204) may be configured to receive lifting elements too such as pallet forks that allow the mechanically linked or locked systems to be moved from vehicle to vehicle or from trailer to trailer. The linked systems may be adjusted to any desired length.

Cross-members 208 positioned between the frame members 202 may provide additional torsional strength and rigidity. In some systems, the cross-members 208 may be equally spaced apart. In other systems (such as those shown in FIG. 2) the box-like structure of the cross-members 208 are positioned to provide sufficient torsional strength to resist twisting when the modular transport system 200 is moved or is supporting freight.

Figure 9:
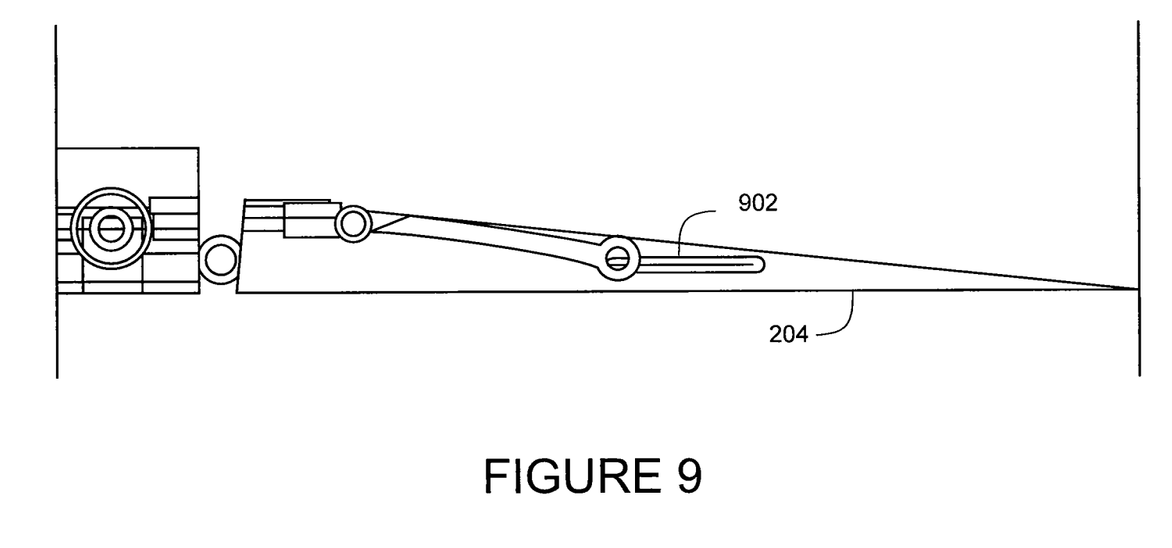
FIG. 9 is a side perspective view of rotatable ramp that may be secured or locked to a barrier wall or dock surface.

Three rotatable ramps 204 may connect or couple the boxed-like frame members 202 to a separated surface. The rotatable ramps 204 may automatically adjust (e.g., self-level) or may be manually adjusted to bridge various vehicle (e.g., trailer surface heights) and dock surface heights through its angular rotation. While the vertical operating range may vary by application, in some applications the vertical operating range may vary with a portion of the angular rotation of the rotatable ramps 204. A manual or automated actuation may secure the vehicle or trailer to a barrier or dock surface to secure the vehicle or trailer during loading and unloading operations. One or more curved members, such as restraining hooks 902 (shown in cross-section in FIG. 9), may secure one or more of the rotatable ramps 204 and frame members 202 to a loading or unloading structure by engaging the structure and establishing a restraining force that counterbalances some or all movement between the vehicle and the barrier or dock surface. When engaged, an optional aural, optical, and/or electronic sensor may identify a secure condition and/or warn of an un-secure connection between the rotatable ramps 204 and the barrier surface or dock surface. The sensor may automatically adjust to ramp movement during loading and unloading events. The curved member or retraining hook 902 may be engaged by a manual, hydraulic, electrical, or pneumatic means, devices, or motors with some locking devices maintaining optimum tension through a spring-loaded take-up device. Blocking members and/or cleats may couple the boxed-like frame members 202 and cross-members 208 to the vehicle (or trailer). Substantially cylindrical pins with blunt ends may rotatably join the rotatable ramps 204 to the boxed-like frame members 202 enabling about a two-hundred degree angular rotation. The cylindrical pins may support the compression force of some of the freight and resist the tensional force between the rotatable ramps 204 and the frame members 202.

In some modular transport systems 200, optional runners 210 may be positioned above some or all of the frame members 202. In FIG. 2, the optional runners 210 are positioned above and supported by the upper surfaces of the side frame members 202 substantially coplanar or slightly raised from the upper surfaces of the frame members 202 positioned between them. The optional runners 210 may terminate with rounded faces. An optional conveyor system that includes one or more conveyor belts (not shown) or other structure that rides upon the optional runners 210 may be driven by an optional drive system (not shown) to move freight between the loading, the transport, and the unloading positions.

Figure 3:
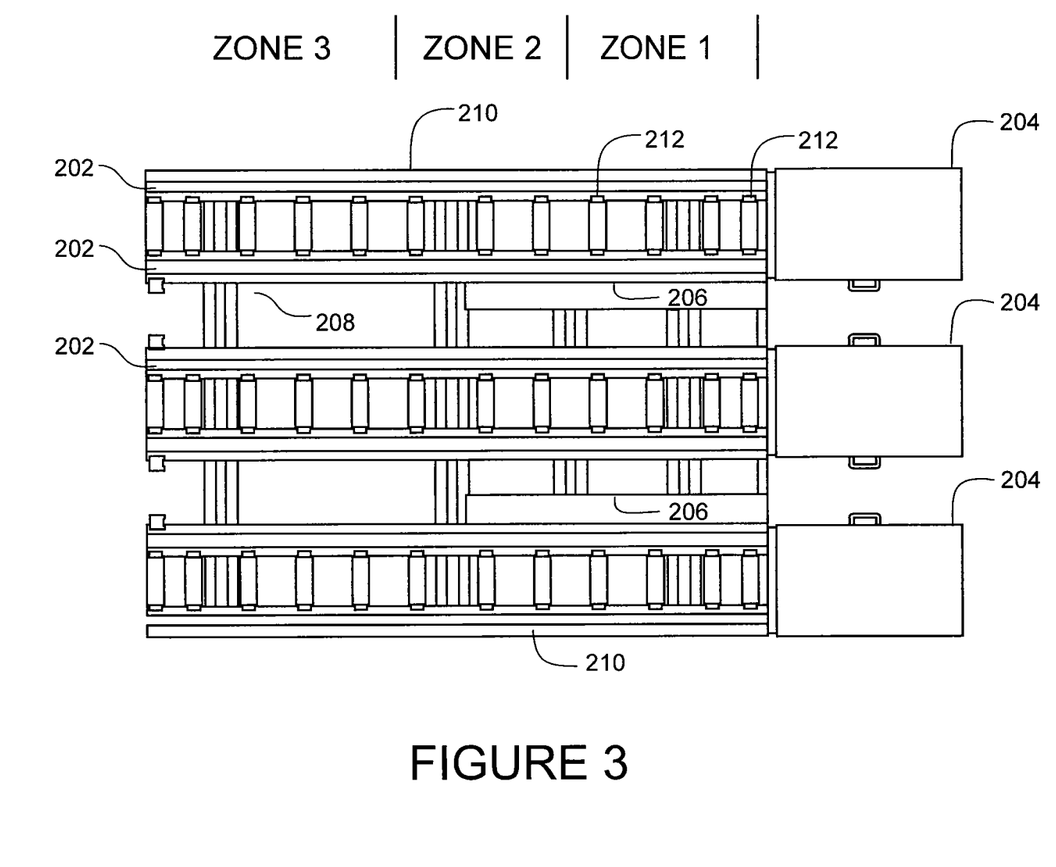
FIG. 3 is a top schematic view of the modular transport system of FIG. 2.

Electric motors, hydraulic motors, pneumatic motors, gravity, external devices or human labor may impart some or all of the moving force that causes freight to move between the loading, the transport, and the unloading positions. The motor or motors may drive selected or all of the cylindrical rollers directly or by belts/chains to provide a controlled loading, a singulation release, and/or a slug release. A processor (and memory or a computer) in communication with or in continuity with optional photoelectric-sensors mechanically coupled to the frame members 202 may ensure that loaded freight is properly positioned or separated in desired zones (e.g., three are shown in FIG. 3) and is unloaded under a selected release or zone protocol. In a zone protocol, on-demand software (executed by the processor or computer) may selectively activate and/or deactivate rollers 212 in selected zones to achieve a desired load configuration or loading and/or release sequence. When loading freight, rollers in zone 1 may be automatically activated in a loading direction until the freight reaches the unloading point of zone 1 (loading point of zone 2). As the freight passes into zone 2, the rollers from zone 1 may be automatically deactivated (to maintain separation between freight) or continue to run to accumulate freight with little or no separation. The sequence may be repeated until the freight reaches a terminating zone (e.g., zone 3 in FIG. 3, or a user designated zone). To unload freight, the rollers from zone 1 may be automatically activated in an unloading (or reverse) direction. When the freight leaves zone 1, the freight in zone 2 moves to zone 1. The process may then be repeated until all or the selected freight is unloaded. While an optional user interface device (e.g., a remote processor or computer) in communication with the processor may allow users to program any loading or unloading sequence, establish a number of zones, or zone lengths, it may also allow users to manually select one or more zones (or activate rollers within the zones) provide dynamic braking control, and allow users to program constant or variable speed and torque settings in any manual or automated sequence.

The transport processor or processors may also communicate with optional sensors or transducers that indicate that a vehicle (or trailer) is secure to a barrier support or dock, may communicate with pressure sensors that monitor weight (and issue alerts as load limits are approached or thresholds are reached), or may communicate with auto-leveling sensors or transducers that detect height or level changes between some or all of the cylindrical rollers 212 from the front-to-rear (or from side-to-side) of a trailer or vehicle and actuate an alarm when a threshold is exceeded. When a height variation is detected (from a level, neutral, or a desired or programmed plane), the processors in some transport systems 200 may actuate one or more load level switches that cause some or all (or a portion of, such as an end portion) of the cylindrical rollers 212 to raise or lower (from front-to-rear and/or side-to-side) or adjust the height of the front, the rear, or the side portion of the entire mobile base 102 through a drive device.

Figure 7:
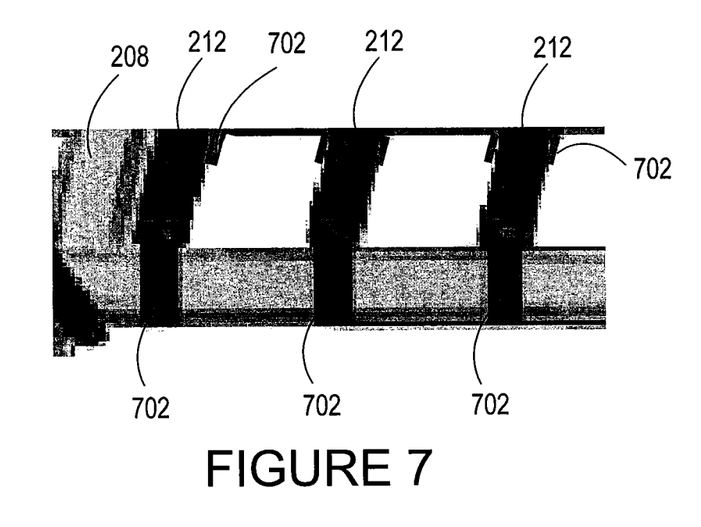
FIG. 7 is a side perspective view of a portion of the transport system that automatically adjusts to freight movement during loading, unloading, and/or transport.
Figure 8:
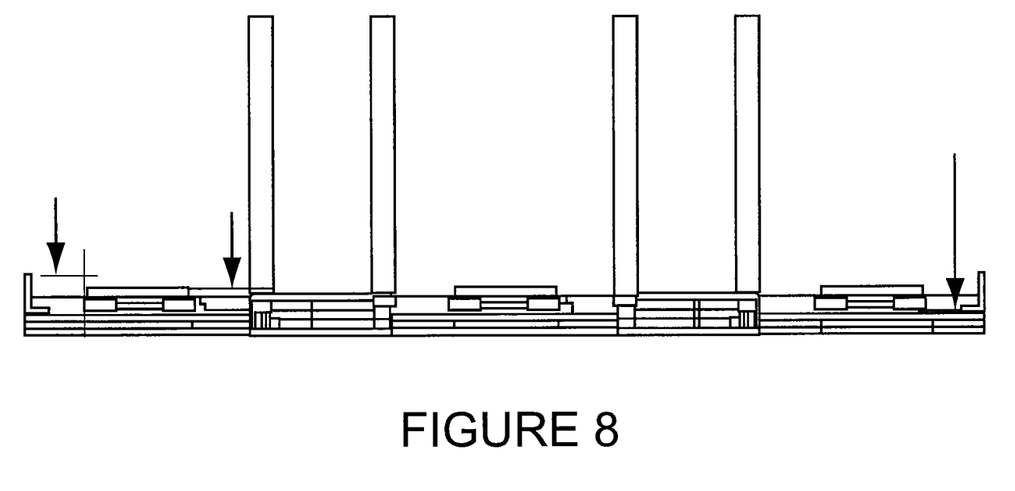
FIG. 8 is a profile schematic view of another alternate transport system illustrating an out of level load.

When a height variation occurs, such as a level shift occurs as shown in FIG. 8, the processor may actuate one or more load level switches that cause one or more rollers 212 to be raised or lowered. Some modular transport systems may raise and lower the rollers 212 along paths or tracks 702 (shown in FIG. 7) through a fluid driver, such as one or more accumulator and hydraulic rams, for example. The drivers may raise or lower one end of the rollers 212 or both ends of the rollers 212 to maintain a level, a neutral, or a desired incline position. Other modular transport systems may maintain a level, neutral, or desired position by self-leveling frame members 202 and/or cross-members 208. The auto-leveling action of these systems may prevent or minimize freight shifts during loading and unloading operations, maintain desired inclines, and in some systems, compensate in real-time or after a delay for freight shift during transport.

Some transport systems 200 may communicate with in-vehicle powertrain controllers (e.g., original equipment manufacturer controllers or processors that are not shown) and/or powertrain sensors of the vehicle through a wireless or tangible media. These transport systems may compensate for any monitored vehicle condition such as those monitored by a powertrain controller including hard braking events, quick acceleration events, hard turning or swaying events, tire slippage events, etc., by adjusting the tilt or inclination of the cylindrical rollers 212 or portions of the boxed-like frame members 202.

To track freight movement, some transport systems such as those shown in FIG. 2 may include optional radio frequency (RF) transceivers diffused or mechanically coupled to the transport system to read passive and/or active radio frequency identification (RFID) tags and labels. The IDs may include human-readable identification that may be associated with a backend-database (not shown) accessible to or in communication with the local transport system's processor or computer. Unlike some exclusive visual identification processes, the radio frequency transceivers are not limited by line-of-sight requirements allowing freight to be loaded and unloaded at a fast rate without a visual inspection. Since some RF transceivers are EPC-compliant, the RF transceivers may be tag-agnostic. These transport systems may work with any EPC compliant RFID inlay.

Figure 10:
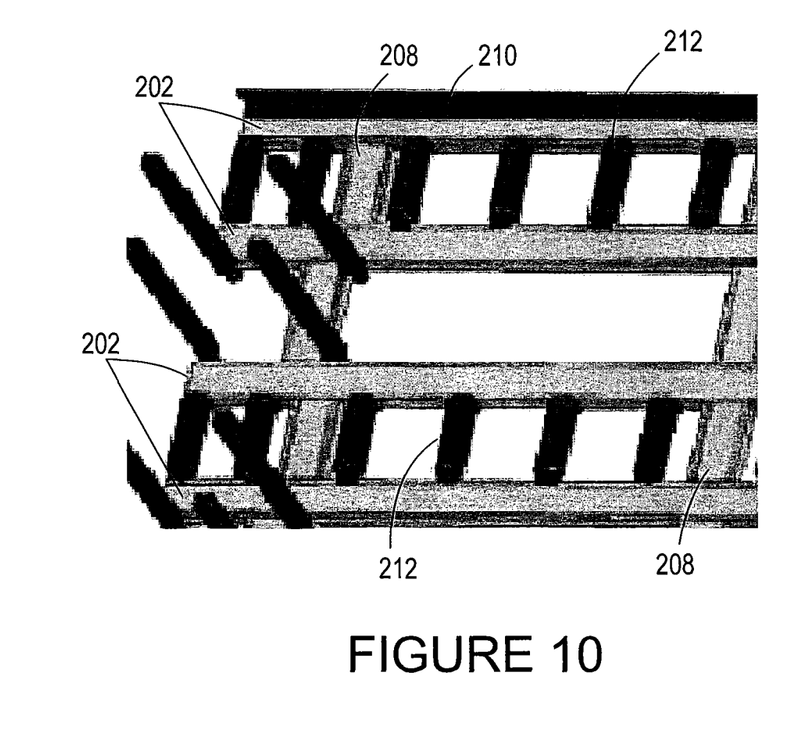
FIG. 10 is a side perspective view of a portion of a transport system comprising directly powered rolling devices.
Figure 11:
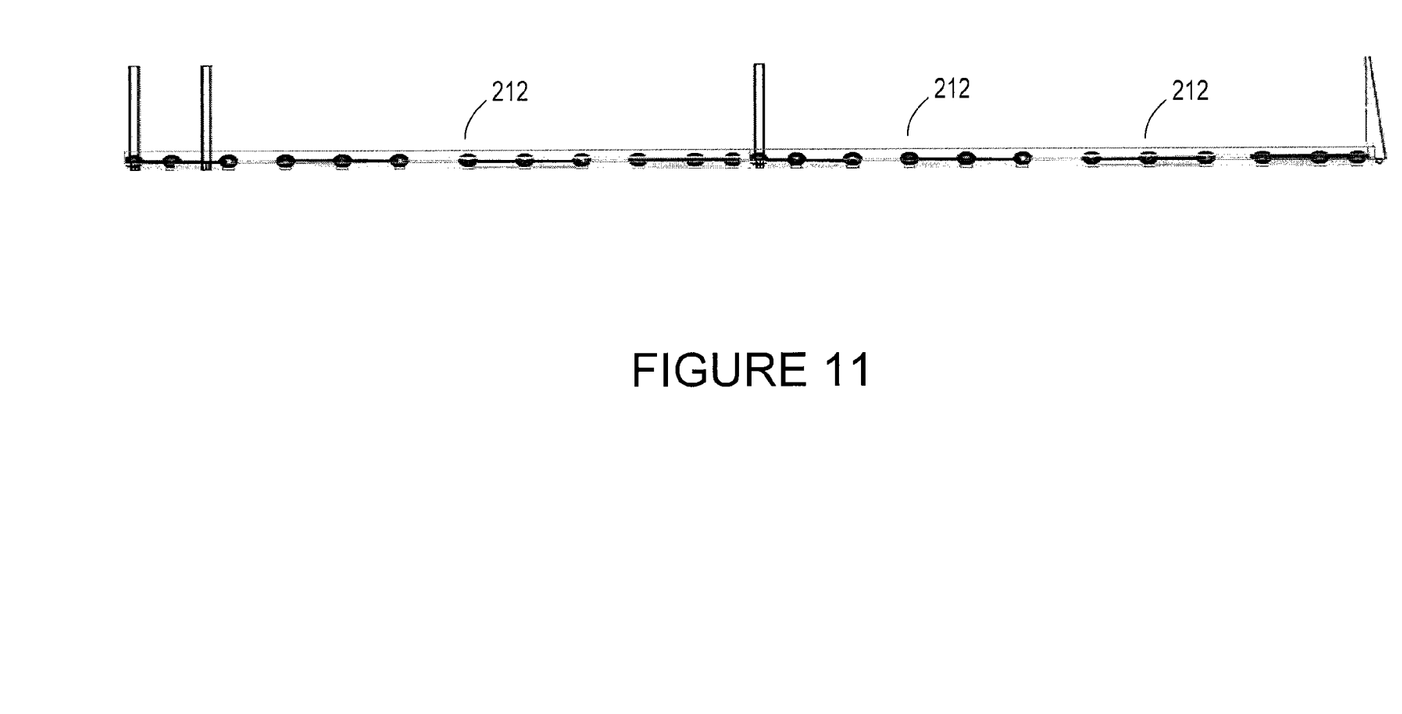
FIG. 11 is a side view of a portion of a transport system comprising motorized master rolling devices and slave rolling devices.

FIGS. 10 and 11 illustrate transport systems powered by motorized rollers that may provide accumulation, dynamic braking, singulation releases and slug releases, forward and reverse runs at user controllable or programmable constant or variable speeds. A processor in communication with one or more sensors (e.g., a photoelectric sensor) may selectively activate and deactivate rollers within a zone (as shown in FIG. 3, for example), to reduce energy usage, roller wear, and control freight release. The motorized drive rollers 212 may be powered though a direct drive mechanism (e.g., with or without any reductions, such as through a gear box—FIG. 10) or may be powered through belts, chains, or other components in a master-slave configuration, for example as shown in FIG. 11. Other transport systems are not self-powered and may be powered by gravity, external devices, or human labor.

Figure 12:
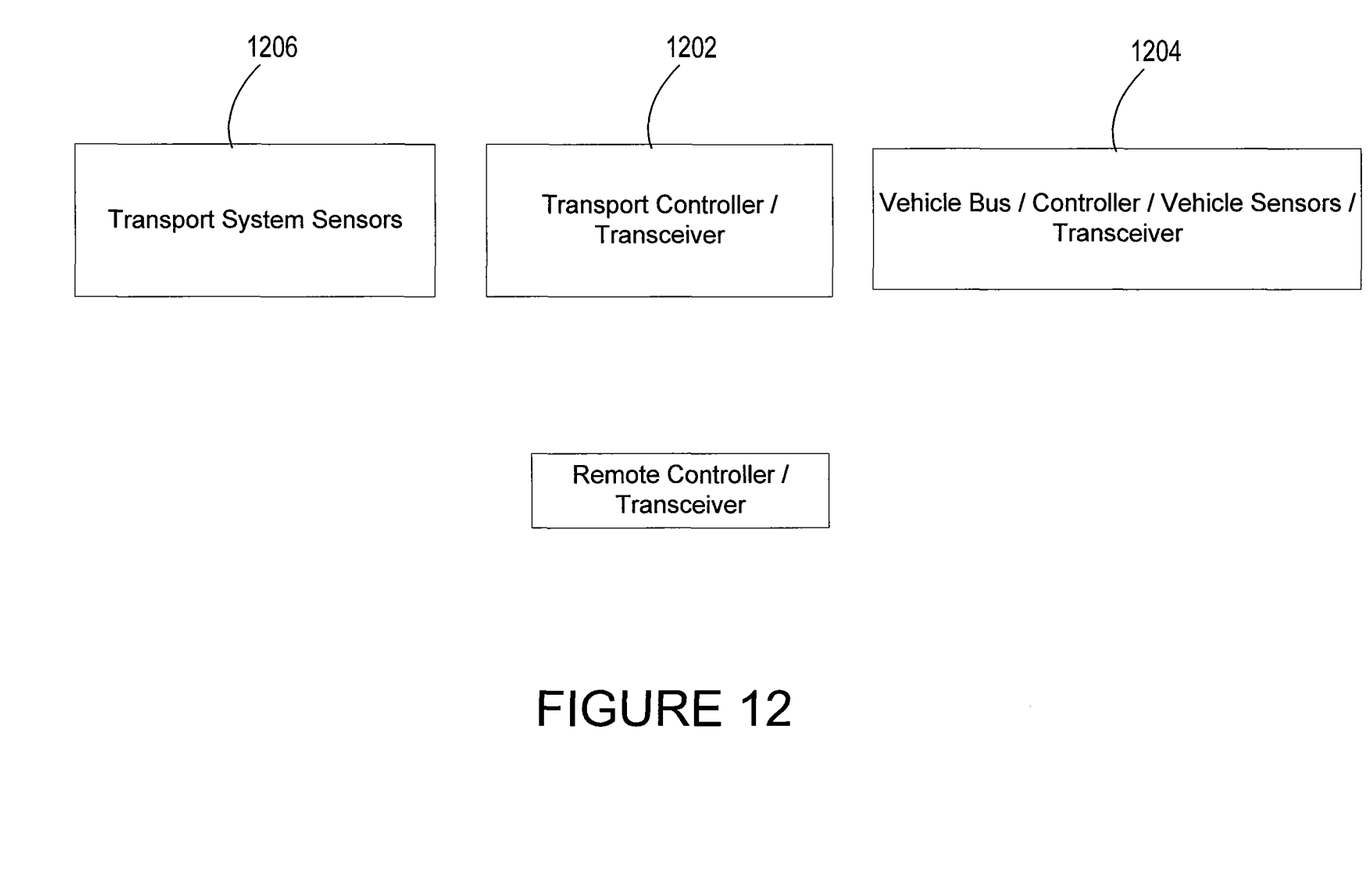
FIG. 12 is a block diagram of a wirelessly linked (or alternatively, hardwire linked or combination of a wireless and hardwire linked) communication system that may include an optional remote controller or transceiver.

In some transport systems, in-vehicle or network communication between the devices shown in FIG. 12 occurs through a wireless protocol or network. Transceivers may provide short and/or long range radio, optical link, or operational links that may not require a physical communication path to receive or transmit data. The communication protocol or network may provide an interoperable communication link with other in-vehicle or external applications and/or devices. In some systems, a wireless network may provide connectivity when the wireless network or a wireless service provider indicates a channel capacity or excess channel capacity to transfer some or all of the desired data to a destination. A transport controller or transceiver 1202 push may load the desired data to a destination and may keep the connection open to allow a transport controller or transceiver 1202 (hereafter transport transceivers) to continue sending the desired data or respond to external requests (e.g., queries). The transport transceiver 1202 may pull data too, in which a connection may or may not remain open.

In some systems, the transceivers shown in FIG. 12 may be compliant with a low-cost, low-power, wireless mesh network, such as Zigbee (e.g., 868 MHz in Europe, 915 MHz in countries such as USA and Australia, and 2.4 GHz in other jurisdictions), or a short range protocol, such as Bluetooth®. The Bluetooth word mark and logos may be owned by Bluetooth SIG, Inc. Bluetooth may encompass the wireless specification defined by IEEE 802.15, 802.15.4 (TG4), 802.15.3 (TG3), or other standards. The standard may include multiple sub-layers including an RF layer that may be based on an antenna power range starting at about 0 dBm up to a range of about 20 dBm in the abut 2.4 GHz band and having a link range from about 10 centimeters to about 10 meters. It may include a baseband layer that establishes a physical link between devices forming a piconet (e.g., a network of devices that may be connected in an ad hoc fashion). It may include a link manager that sets up the link between Bluetooth devices. Other functions of the link manager may include security, negotiation of baseband packet sizes, power mode and duty cycle control of the communication portion of the device, and the connection states of a compliant device in a piconet. Also, it may include a logical link control and adaptation protocol (L2CAP) that provides the upper layer protocols with connectionless and connection-oriented services.

An optional user input device may be operatively connected to the transport controller or transceiver 1202 through a virtual or physical connector. The transport controller or transceiver 1202 may receive power through the vehicle, an external source, or an internal source (e.g., battery or elements that temporarily store charge) or other sources, such as a solar based system (not shown). In other systems, the device may draw power from the vehicle or a network it interfaces.

A cellular or wireless protocol, a wireless or cellular telephone, a radio, a satellite, or other wireless communication system may link the transceivers (and sensors) shown in FIG. 12 to a privately accessible or publicly accessible distributed network or directly to an intermediate surrogate or central control station. The communication link may comprise Mobile-FI or a low-cost, always-on, mobile broadband wireless network that may have IP (Internet Protocol) roaming & handoff (at more than about 1 Mbit/s), MAC and PHY with IP and adaptive antennas, full mobility or substantial mobility up to vehicle speeds of about 88.7-162 km/h or higher (e.g., 250 km/h), operate in frequency bands (below 3.5 GHz), and/or utilize a packet architecture and have a low latency. In some applications, the transceivers (and sensors) may be Ultra-wideband compliant and may transmit information by generating radio energy at specific time instants and occupying large bandwidth, thus enabling a pulse-position or time-modulation communications. This protocol may be different from other wireless protocols that transmit information by varying the power level, frequency, and/or phase of a sinusoidal wave. In other applications, the system may be complaint with WiMax or IEEE 802.16a or may have a frequency band within a range of about 2 to about 11 GHz, a range of about 31 miles, and a data transfer rate of about 70 Mbps. In other applications, the device 300 may be compliant with a Wi-Fi protocols or multiple protocols or subsets (e.g., Zig-Bee, High Speed Packet Access (e.g., High Speed Downlink Packet Access and/or High Speed Uplink Packet Access), Bluetooth, Mobile-Fi, Ultrawideband, Wi-Fi, WiMax, mobile WiMax, cellular, satellite, etc., referred to as the transceiver protocols) that may be automatically detected and selected (through a handshaking, for example, that may automatically determine the source type of the transmission e.g., by a query for example, and may attempt to match it) and may enable this automatic access through one or more communication nodes. In some systems, automatic selection and/or detection may occur through an exchange of signals that acknowledge a communication or a transfer of information or data may occur at a desired or predetermined channel capacity. In some alternative systems, the transceivers (and sensors) may not directly communicate or connect to a central base station. Like a mesh network, the transceivers (and sensors) may transmit information between themselves (like an electronic bucket brigade) which may be relayed to a destination. Built-in logic may allow some transceivers (and sensors) to relay information from one transceiver (and sensor) to another when wireless networks are unavailable, device failures occur, bandwidth restrictions occur, or other conditions warrant. In some applications, a receive-and-relay feature in some transceivers (and sensors) may allow devices to conserve power by not transmitting data or messages continuously and directly to base stations. Some devices may communicate data across relatively short distances (e.g., a few yards or 100 yards between mobile or stationary the transceivers, for example) instead of the larger distances a communication to a stationary wireless base station may require.

The devices shown in FIG. 12 may include or interface a data storage device (or storage devices), an input/output interface that may communicate with one or more external devices, one or more central processing units, a local memory that may be separated into multiple partitions or portions, and/or a real-time operating kernel. The exemplary in-vehicle systems of FIG. 12 may be portable, non-portable, or a unitary part of a vehicle too. Each of the systems may include memory accessible only to a remote site. The memory may be inaccessible to other in-vehicle OEM or aftermarket systems to ensure data integrity. Hardware, data encryption, or software may maintain data security.

The methods and/or functions described may be encoded in a signal bearing medium, a computer readable medium or a computer readable storage medium such as a memory that may comprise unitary or separate logic, programmed within a device such as one or more integrated circuits, or processed or executed by processors (such as those described above), one or more controllers, servers, or server clusters. If the methods and/or descriptions are performed by software, the software or logic may reside in a memory resident to or interfaced to one or more processors, digital signal processors, or controllers, a communication interface, a wireless system, a powertrain controller, and/or a body control module of a vehicle, a non-vehicle or may be retained in discrete non-volatile or volatile memory. The memory may retain an ordered listing of executable instructions for implementing logical functions. A logical function may be implemented through digital circuitry, through source code, through analog circuitry, or through an analog source such as through an analog electrical, or audio signals.

The software may be embodied in any computer-readable storage medium or signal-bearing medium, for use by, or in connection with an instruction executable system or apparatus resident to a vehicle or a hands-free or wireless communication system. Alternatively, the software may be embodied in a navigation system. Such systems may include a computer-based system, a processor-containing system that includes an input and output interface that may communicate with an automotive, vehicle, or wireless communication bus through any hardwired or wireless automotive communication protocol, combinations, or other hardwired or wireless communication protocols to a local or remote destination, server, or cluster.

A computer-readable medium, machine-readable storage medium, propagated-signal medium, and/or signal-bearing medium may comprise any medium that stores, communicates, or transports software for use by or in connection with an instruction executable system, apparatus, or device. The machine-readable storage medium may comprise an electronic, magnetic, optical, electromagnetic, infrared, or semiconductor system, apparatus, device, or propagation medium. A non-exhaustive exemplary list of a machine-readable medium would include: an electrical or tangible connection having one or more links, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. Some machine-readable medium may include a tangible medium upon which software is printed, as the software may be electronically stored as an image or in another format (e.g., through an optical scan), then compiled by a controller, and/or interpreted or otherwise processed. The processed medium may then be stored in a local or remote computer and/or a machine memory.

The transport controller 1202 may communicate with one or more machine or vehicle components 1204 and 1206 to acquire information from the vehicle that describes the state or represents the status of the transport system and/or vehicle operation or characteristics. Vehicle operation may be monitored through one or more sensors (e.g., powertrain sensors, safety sensors, ancillary sensors, etc.). Additional sensors may communicate wirelessly or across a physical or virtual data bus.

The mobile moving system described above may move bulk materials, palatalized loads, non palatalized unitized loads, parcels, loose items, etc, onto devices or structures for transporting persons or things. The systems may convey these materials to truckload (TL) carriers, less-than-truckload (LTL) carriers, airfreight carriers, rail cars, parcel carriers, local delivery vehicles and vessels. The system may provide multiple modes of accumulation across multiple zones, bi-directional movement, and multi-speed movement that may be carried or moved from one transport system to another with ease and may be linked to accommodate any carrier size. Some systems may transform a straight vehicle (that may have a connected body and cab) into a conveyor or roller-bed type vehicle. Some alternate systems may include combinations of some or all of the structure and functions described above or shown in one or more or each of the figures. These systems are formed from any combination of structure and function described or illustrated within the figures.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A mobile moving system for moving freight comprising:
a plurality of movable approach ramps;
a mobile base comprising a frame, a plurality of parallel pocket members, and a plurality of material handling devices,
where the mobile base is configured to overlay a bed of a vehicle,
where the plurality of material handling devices are configured to move freight longitudinally between a loading position, a transport position, and an unloading position of the mobile base;
where the plurality of parallel pocket members are positioned in pairs and a portion of the plurality of the material handling devices are spaced out alongside and between each pair of the parallel pocket members;
where each of the plurality of material handling devices are directly coupled to inner edges of at least one pair of plurality of parallel pocket members;
where at least one pair of the plurality of parallel pocket members are spaced apart and dimensioned so that the at least one pair of the plurality of parallel pocket members may receive one or more prongs of a transport vehicle and provide structural support allowing the mobile base to be movable by the transport vehicle to and from the bed of the vehicle; and
where the parallel pocket members are coupled to the frame of the mobile base.

2. The mobile moving system of claim 1 further comprising a plurality of locking receptacles configured to receive an upright that is used to secure and protect loads during transport.

3. The mobile moving system of claim 1 where the plurality of movable ramps comprises self-leveling ramps that compensate for height variations between the mobile base and a loading dock height.

4. The mobile moving system of claim 3 where at least one of the plurality of movable approach ramps comprises a securing lock that provides a sufficient securing force to secure a vehicle trailer to a loading dock when loading or unloading freight.

5. The mobile moving system of claim 4 where the securing lock is unitary to the at least one of the plurality of movable approach ramps.

6. The mobile moving system of claim 4 further comprising an aural or visual alarm programmed to alert users of an un-secure connection between the securing lock and the loading dock.

7. The mobile moving system of claim 4 where the securing lock is powered by a motor.

8. The mobile moving system of claim 1 further comprising sensors mechanically coupled to the mobile base and in communication with a processor programmed to cause the plurality of material handling devices to position freight in a straight, a turned, and a pin-wheeled position.

9. The mobile moving system of claim 1 further comprising a plurality of pressure sensors mechanically coupled to the mobile base and in communication with a processor programmed to monitor weight and transmit alerts when load limit thresholds are reached.

10. The mobile moving system of claim 1 further comprising a plurality of sensors mechanically coupled to the mobile base and in communication with a processor programmed to ensure freight is loaded onto the material handling devices is properly separated into a plurality of zones and may unloaded under a singulation and a slug release protocol.

11. The mobile moving system of claim 1 further comprising a plurality of auto-leveling sensors mechanically coupled to the mobile base and in communication with a processor mechanically coupled to the mobile base that is configured to adjust the height of a front, a rear, and a side portion of the mobile base when a height variation is detected between two or more of the plurality of material handling devices.

12. The mobile moving system of claim 10 where the processor is in communication with an in-vehicle power-train controller.

13. The mobile monitoring system of claim 9 where the processor compensates for vehicle conditions monitored by the in-vehicle power-train controller.

14. A mobile moving system for moving freight comprising:
 a plurality of movable approach ramps;
 a mobile base comprising a frame, a plurality of box-like frame members, a pair of parallel pocket members, and a plurality of material handling devices, that overlay a bed of a vehicle;

where the plurality of material handling devices are configured to move freight longitudinally between a loading position, a transport position, and an unloading position of the mobile base;

where the plurality of box-like frame members are positioned in pairs along a portion of the plurality of the material handling devices and the portion of the plurality of the material handling devices are spaced out between each pair of box-like frame members and directly coupled to inner edges of at least one pair of box-like frame members;

where the pair of parallel pocket members are spaced apart and dimensioned so that the pair of the plurality of parallel pocket members may receive one or more prongs of a transport vehicle and provide structural support allowing the mobile base to be movable by the transport vehicle to and from the bed of the vehicle; and where the plurality of parallel pocket members are directly coupled to the mobile base.

15. The mobile system of claim 1 wherein the mobile base is further configured to be longitudinally adjustable.

16. The mobile moving system of claim 1, wherein the plurality of parallel pocket members are configured to be mechanically joined to a second plurality of parallel of pocket members of a second mobile base.

* * * * *